INVENTOR.
Peter M. Sampatacos
BY
Peter P. Kozak
ATTORNEY

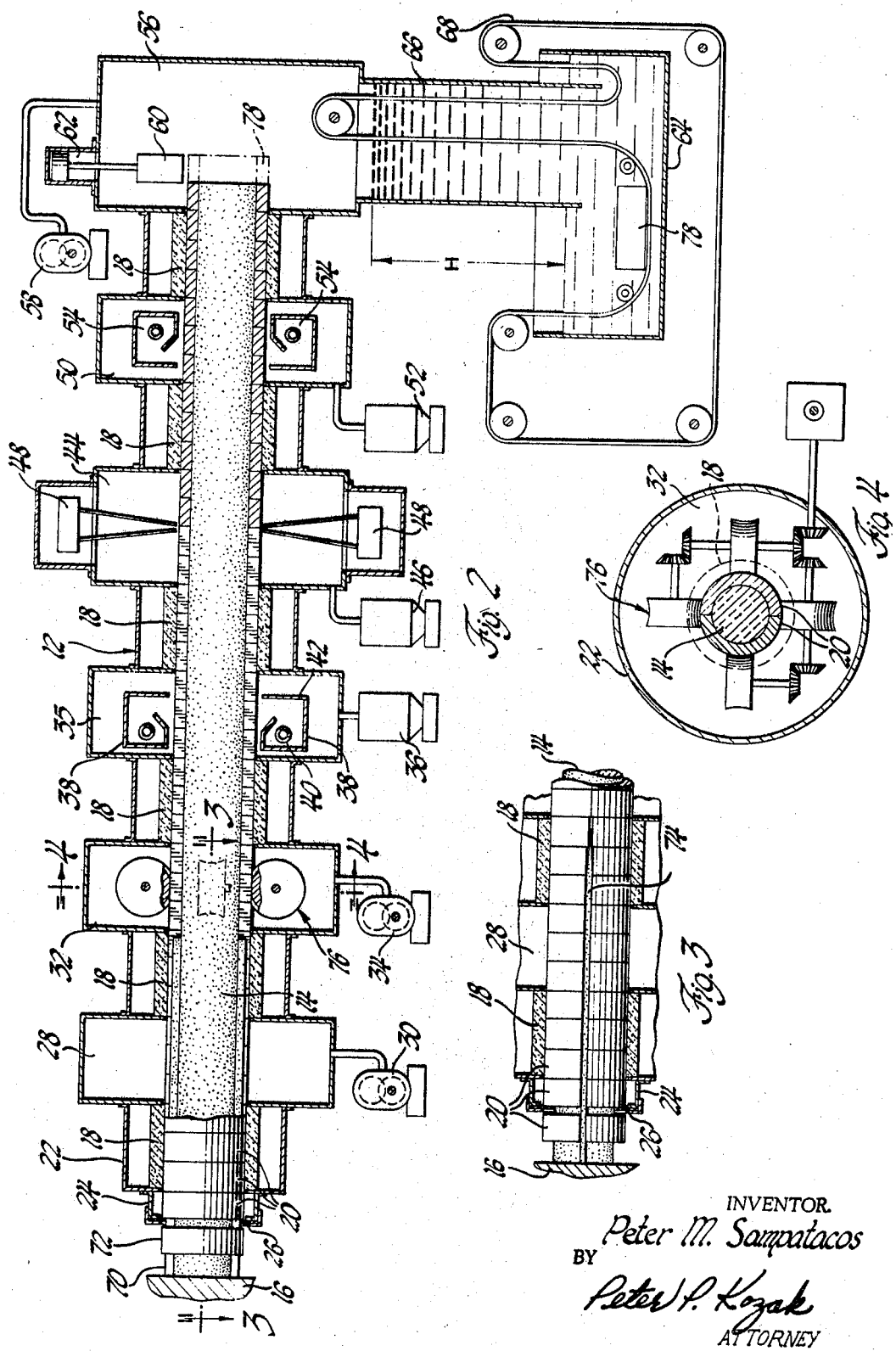

United States Patent Office 3,482,296
Patented Dec. 9, 1969

3,482,296
METHOD FOR THE INTEGRATED WELDING AND HEAT TREATING OF HARDENABLE PARTS
Peter M. Sampatacos, Cheshire, Conn., assignor to General Motors Corporation, Detroit, Mich., a corporation of Delaware
Filed Sept. 19, 1966, Ser. No. 580,284
Int. Cl. B23k *31/02;* B21d *53/12;* B21h *1/12*
U.S. Cl. 29—148.4                                                             4 Claims

ABSTRACT OF THE DISCLOSURE

A method of forming bearing rings and the like is disclosed. In a preferred embodiment a strip of hardenable bearing steel is formed into semicircular members, pairs of semicircular members are positioned on a cylindrical mandrel with their respective ends in abutting relationship, the abutting members are moved along the mandrel into a vacuum chamber wherein they are heated above their austenitic transformation temperature and electron beam welded, and finally the welded austenitic steel rings are quenched to a desired condition of hardness.

---

My invention relates generally to welding and heat treating hardenable material and more particularly to a method and apparatus to concurrently effect a welded joint between two ferrous alloy members and heat treat the entire structure. My invention is especially suitable for, but not limited to, the manufacture of bearing rings or races.

For some time, the economic advantages of the following general method of bearing manufacture has been recognized. This method comprises forming strip or bar stock to approximately the desired final cross sectional shape of a bearing race (such forming including rolling, drawing or other means suitable to form a raceway or the like in the strip), cutting the formed strip to a suitable length, bending the cut strip to circular or semicircular configuraion and welding abutting ends to complete the bearing race. This method virtually eliminates the generation of scrap and many of the grinding and machining operations associated with conventional bearing race manufacturing techniques. The aforementioned method while known for some time as exemplified by the expired patent to Hess 1,967,821, has not yet found commercial acceptance. The reluctance on the part of the purchaser and manufacturer is due mainly to fear of premature bearing ring failure at the welded joint. The fear is based on the fact that the bearing sections to be joined (as well as sections of other welded articles) are usually heated only in the vicinity of the weld so that the metal, as for example steel bearing alloy, adjacent the weld selectively undergoes phase transformation and volume change resulting in residual stresses and an undesirable grain structure and microstructure. Even when heat has been more uniformly applied by prior art techniques the undesirable residual stresses in ferrous bearing alloys have not been completely eliminated. While these latent defects in the structure adjacent the weld can be corrected to some extent by additional working of the part, experience has shown the discriminating purchaser that the weakness of the bearing still lies in the weld area and that this weakness is most easily circumvented by purchasing bearings made by older and more costly techniques. The older techniques generally comprise a number of forming and grinding operations with the metal in a relatively soft condition followed by separate heat treating steps to harden the steel. In addition to these older techniques being more costly due to material scrappage and high fabrication time, additional time and cost are involved in a hardening heat treatment of the part at the point of almost complete manufacture.

It is an object of my invention to provide a method of concurrently welding and heat treating hardenable ferrous metal alloys whereby there are no localized phase transformations and volume changes thereby significantly improving the strength and quality of the weld and of the entire structure.

It is another object of my invention to provide a process and apparatus which, in a preferred embodiment, are especially suitable for making bearing races, which bearing races are made with a welded joint and concurrently heat treated thereby eliminating many time consuming and costly steps from other conventional manufacturing methods. In addition, a bearing made by my invention virtually eliminates the formation of scrap while the end product consistently demonstrates greater endurance and capacity than rings from conventional manufacturing techniques.

A more specific object of my invention in terms of a preferred embodiment is to provide a method and apparatus for welding steel bearing races in which the steel is welded in the austenitic condition and is thereafter quenched to a predetermined condition of hardness and microstructure thereby integrating the welding and heat treatment of the steel into a simpler and cheaper operation.

Other objects and advantages of my invention will hereinafter become more fully apparent from the following description of the annexed drawings which illustrate preferred embodiments and wherein:

FIGURE 2 is a schematic view partly in section and partly broken away, of apparatus in accordance with my invention capable of carrying out my welding-heat treatment process;

FIGURE 3 is a sectional view of a portion of the apparatus shown in FIGURE 2 as viewed along line 3—3 of FIGURE 2; and FIGURE 4 is also a sectional view of a different portion of the apparatus of FIGURE 2 as viewed along line 4—4.

Figure 1:
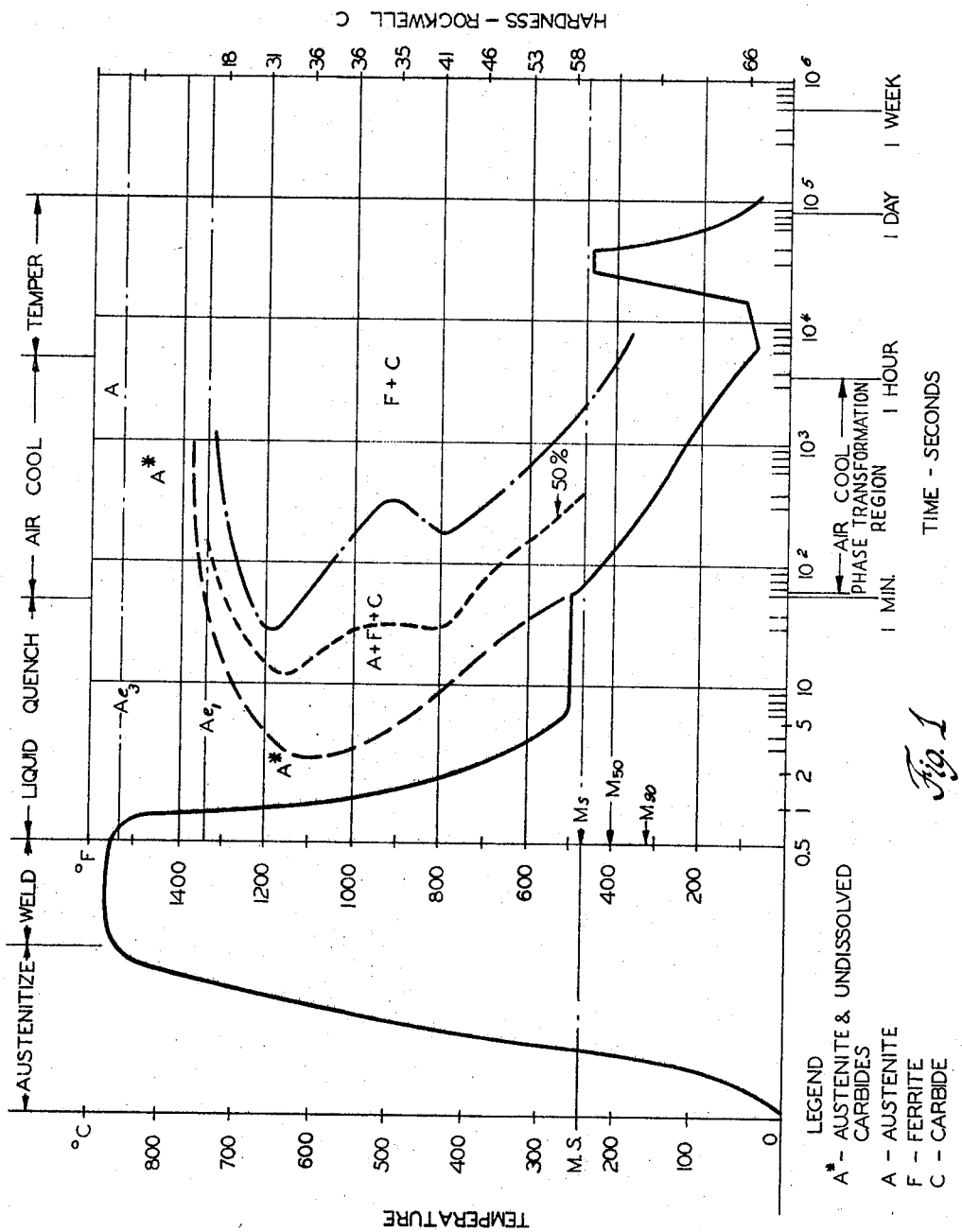
FIGURE 1 is a time-temperature curve illustrating the steps of my process. Included as a part of this figure is a time-temperature-transformation curve for SAE 52100 steel, a commonly used bearing steel, showing the time-temperature phase transformation relationship which a steel part undergoes after welding when processed in accordance with my invention.

Referring to the time-temperature curve of FIGURE 1, I will now explain the steps of my invention relative to the welding and heat treating of a steel bearing race partially manufactured by the old known technique of forming a bearing race from strip stock which is bent to circular or semicircular form and in which the ends are to be butt welded.

My invention is primarily directed toward the steps of welding and heat treating the bearing rings thus formed. I preferably use two semicircular bearing halves which require two welds at diametrically opposite joints. In order to circumvent the undesirable localized phase transformations and volume changes I heat the bearing halves above their austenitic transformation temperature, ($Ae_3$ in FIGURE 1) the temperature for a given steel above which the alloy completely transforms to austenite. This temperature varies depending on the type of steel being used. As part of FIGURE 1, I have shown an isothermal transformation curve for SAE 52100 steel which is a typical bearing steel. This is an electric furnace steel and its ladle chemical composition limits are commonly specified to be, by weight: 0.95 to 1.10% carbon, 0.25 to 0.45% manganese, up to 0.025% phosphorus, up to 0.025% sulfur, 0.20 to 0.35% silicon, 1.30 to 1.60% chromium, and the balance substantially all iron. However, nickel is sometimes incorporated up to about 0.20 to 0.25% by weight. The upper critical limit ($Ae_3$) for this alloy is approximately 1550° F. In accordance with my process the bearing ring halves are heated above the upper critical temperature for a sufficient time to completely austenitize the steel throughout the parts. Here again, the time to austenitize the part will depend on the type of steel with the exact time necessary for a given steel being easily determinable from standard charts. Once the parts have been austenitized, the abutting ends are welded while the halves are maintained austenitic. In order to prevent oxidation of the halves while being welded, they are preferably placed in a vacuum environment and the weld is accomplished by directing an electron beam at the junctures of the abuting edges. Electron beam welding is described in the patent issued to Steigerwald, U.S. 2,987,610. This type of welding is preferred in my process because beams of electrons can be focused on a very small area at the joint and the technique is very efficient. In welding with electron beams I preferably use a pulsed application of the beam to reduce locally excessive temperatures and vapor formation during welding thereby eliminating weld deficiencies. The halves are maintained austenitic during welding within a vacuum environment. Thus, no part of the workpiece, except for the solidifying metal, undergoes phase transformation until after the weld has been completed. The assembly may then be quenched and hardened without further heating. In the embodiment of my invention which is now being described the welded race is quenched in a nonoxidizing environment, such as for example a bath of a molten salt, a suitable oil, liquid lead, or other suitable liquid metal, from above the upper critical limit to a predetermined temperature to obtain a desired condition of hardness. The race may then be additionally cooled prior to being exposed to an oxidizing atmosphere. The quenching may be followed by tempering as necessary or desired.

The specific preferred treatment to which bearing races are subjected is as shown in FIGURE 1. After welding the race is martempered, that is, it is liquid quenched to approximately 500° F. in about eight seconds and maintained there for approximately one minute before being exposed to an oxidizing atmosphere. This rate of cooling is sufficient to completely miss the nose of the TTT diagram and avoid the undesirable phase transformation of austenite to ferrite and cementite. As stated, the quench bath is maintained at about 500° F. slightly above the $M_s$ (Martensite start limit) temperature. The race is subsequently cooled in air or a controlled atmosphere to approximately room temperature over a period of about one hour during which time the austenite transforms into martensite, a microstructure having a high hardened characteristic. After the race has been transformed to this grain structure, the race is tempered to the desired combination of toughness and hardness by elevating its temperature to just below the $M_s$ line for a time and then cooling. The above-described hardening of the steel is known as martempering. Of course, other heat treat cycles could be suitably used in accordance with my invention subsequent to the welding step. In each case the temperature of the quench bath and/or the rate of cooling for a specific heat treatment and a specific ferrous alloy may be obtained from isothermal transformation data of the type depicted in FIGURE 1 for SAE 52100 steel. This information is available in various textbooks, journals, and handbooks and is readily interpreted by competent metallurgists. An advantage of my method is that there is no localized phase transformation or volume change in the welded part (other than the solidification of the molten alloy at the weld) and the completely austenitic material may be converted immediately to a desired microstructure and grain size without further heating.

In FIGURES 2, 3 and 4 I have shown an apparatus 12 which is suitable for use in a preferred embodiment of my welding-heat treatment process; the joining of preformed semicircular bearing race members. As best seen in FIGURE 2, a suitable cylindrical ceramic or high temperature metal mandrel 14 is provided such that pairs of semicircular bearing race members may be snugly positioned around it in abutting relationship and moved along its surface from left to right. Over most of its length the mandrel 14 is sealed within a housing 22 so that the environment within the enclosed space may be controlled in a predetermined manner. Within the housing 22 is a circular ceramic or refractory alloy sleeve 18 which is concentrically disposed about the mandel 14 in spaced relationship thereto. The porosity of the mandrel 14 and sleeve 18 may, if desired, be controlled to permit injection of argon, nitrogen, helium or other suitable inert gas into the space about the rings 20. The respective dimensions of the mandel 14 and the sleeve 18 are such that the semicircular ring members 20 may be moved along the mandrel 14 while clearing the inner cylindrical surface of the sleeve by only a few thousandths of an inch. Sealing means can be provided at each end of the housing 22 so that a vacuum may be maintained within the apparatus 12 while the semicircular ring members 20 are continuously introduced thereto and withdrawn therefrom. At the left end of the apparatus as shown in FIGURE 2, which is the point at which the ring members are introduced, the housing 22 is closed by a gate 24 which includes a flexible annular seal 26. The flexible seal 26 bears against the steel ring members which are being moved along the mandrel 14. At the right end of the housing 22 a seal is maintained by a barometric height of liquid 66 which will be discussed in more complete detail below.

As shown in FIGURE 2 the mandrel 14 is suitably mounted at the left end on a stationary support 16. Viewing from the left end to the right end of the apparatus 12 it is observed that the continuity of the sleeve 18 is interrupted by a plurality of annular stations or chambers 28, 32, 35, 44 and 50 within the housing 22. These chambers 28, 32, 35, 44 and 50 are interconnected because of the clearance between the semicircular rings 20 and the sleeve 18 and they are used in combination with heating and pump means to provide a suitable environment for carrying out the process of my invention. The first annular chamber 28 is evacuated by a mechanical pump 30 as shown, or by other suitable means such as a multistage steam ejector. The second chamber 32 is also evacuated by a mechanical pump 34. In normal operation it is preferred that the absolute pressure in the first chamber 28 be below about 500 microns of mercury and the absolute pressure in the second chamber 32 about 100 microns of mercury. A third chamber 35 is evacuated by a diffusion pump 36 to an absolute pressure of about 1 micron. Chamber 35 houses a pair of electron beam heaters 38 each of which comprises a thermionic emitting heated filament or coil 40 and an electron beam control shield 42. Filament 40 is maintained at a high negative potential and the shield 42 is maintained at an intermediate potential to permit control of the shape of the electron beam. The electron beam is thus accelerated to the rings 20, which are at ground or zero potential, bombarding and thus heating them.

Next is chamber 44 which houses a pair of diametrically opposed electron beam welders 48 and is evacuated by a diffusion pump 46. The operative pressure in chamber 44 suitable is below 1 millimeter of mercury and preferably is below about 0.5 micron. A second pair of electron beam heaters 54 are disposed in chamber 50 which is evacuated by a diffusion pump 52. Although it is not specifically shown in FIGURE 2, it is to be understood that diffusion pumps are typically backed up by a mechanical pump. The chamber 56 at the end of the ceramic mandrel 14 and sleeve 18 is evacuated by a mechanical pump 58 and contains a plunger 60 driven by a pneumatic or hydraulic motor 62. The lower end of chamber 56 is disposed in a sump 64. The sump and lower portion of chamber 56 are filled with a quenching liquid 66. Since the chamber 56 is at a low absolute pressure, well below one millimeter of mercury, and the sump 64 is exposed to the atmosphere, the quenching liquid rises to approximately a barometric height H in the lower end of chamber 56. A suitable conveyor 68 runs through the quenching liquid to remove the races from it to the atmosphere.

Referring now to the left-hand end of the figure, its mode of operation in practicing a preferred embodiment of my welding-heat treat process will be explained. A pair of semicircular bearing rings 70 and 72 are shown. These bearing rings which have already been formed to the desired cross sectional shape and size are fed onto the central mandrel 14 at the left-hand end by a suitable feed mechanism (not shown). It is to be understood that the offset relationship of the bearing halves 70 and 72 is for the purposes of illustration only and that in actual practice, these bearing halves would be aligned with their abutting edges lying in the plane of the drawings at least by the time they reach the welding guns 48. The pumps 30, 34, 36, 46, 48, 52, and 58 evacuate the entire housing to a low absolute pressure. Because there is only a few thousandths of an inch clearance between the bearing parts 20 and the annular space defined between mandrel 14 and the sleeve 18, the pumps are able to maintain this vacuum even though some leakage occurs between the races and the mandrel and outer sleeve. The vacuum in the apparatus draws the parts inwardly toward the right. If desired, a suitable guide 74 (as shown in FIGURE 3) to assure alignment of the bearing halves and a suitable feed rate mechanism 76 (shown in FIGURE 4) may be included to regulate the feed rate of the races. As shown in the drawings, the entire space between the mandrel 14 and sleeve 18 is filled with pairs of bearing halves 20 in end to end abutting relationship. The bearing halves are fed to the right along the mandrel in a vacuum environment. At chamber 35, the races are heated by electrons emitted from coil 40 of the heater 38 and directed toward the bearing halves by the shield 42. The energy level of the electron beam heater and the feed rate are adjusted so that the steel race parts are completely austenitized by the time they reach the next station or chamber 44 containing the electron beam welder 48. In the chamber 44 the semicircular austenitized steel bearing halves have the abutting edges welded together as they pass together under the beam. Commercially available welders provide for focusing and aiming of the beam at the exact juncture of the abutting edges. As previously stated, the electron beam is preferably applied in a pulsed manner so that the parts are not heated excessively and so that the vapors formed by the welding are allowed to escape during the non-application periods. The period of pulsing is roughly one to ten, that is, one time period of application for every nine time periods of nonapplication. Of course, this is an approximate figure and the exact pulsing mode may vary from 5% on, 95% off to 95% on, 5% off depending on the desired welding conditions, and the material being welded, the geometry of the part being welded and the feed rate of the parts past the welding gun. After having been welded, the 52100 steel bearing parts are maintained austenitic by the second electron beam heater 54 in chamber 50 and in a vacuum environment. Shortly thereafter and while still austenitic, the parts reach the end of the mandrel. Because of the continuous weld a completed race 78 must be separated from the adjacent one as it comes off the end of the mandrel. This is easily accomplished by a timed actuation of the motor 62 to move plunger 60 to break away each bearing ring as it comes off the end of the line. Note also that the chamber 56 is at vacuum so that the parts have been in a nonoxidizing environment up to this point. As the plunger knocks the end bearing ring 78 off, it falls into the quenching liquid 66. The quenching liquid is selected for a desired quenching temperature and cooling rate for the part which in turn are determined by the desired microstructure and condition of hardness. Other criterion for the selection of the quench are compatability for material being quenched, vapor pressure characteristics and specific gravity. The vapor pressure affects the vacuum level and specific gravity affects height H of the barometric leg. After the welded part 78 falls into the quenching bath 66, it is picked up by the conveyor 68 and brought out into the atmosphere for a subsequent air cooling. The parts may then be taken off the belt and tempered, if desired.

Of course, one skilled in the art would recognize that ferrous alloys other than SAE 52100 steel may advantageously be welded and heat treated in accordance with my process. Any ferrous-based composition as for example steel, including stainless steels, or cast iron which may be austenitized by heating and subsequently hardened by quenching or other means of rapid cooling, may be so treated. Also in some cases it may not be required that the steel be through hardened. It may be preferred to anneal the steel rather than fully harden it. In this event the temperature of the quench bath could suitably be kept above the transformation temperature for the complete anneal of the parent metal and weld metal. After removal from the quench bath, the workpieces are slow cooled at a rate to obtain a full anneal.

Within the scope of my invention any welding means whereby two ferrous alloy members are first heated into the austenite region and then further heated up to the molten state at the surfaces to be joined, with or without the addition of filler metal, could be used in accordance with my invention. Thus, the energy for melting ferrous alloys can be provided by such well known processes as metallic arc welding, carbon arc welding, atomic hydrogen welding, an acetylene gas flame, oxy-acetylene flame, oxy-hydrogen and the like, as well as electron beam welding.

It is also to be understood that the welding and heat treating environment can be other than a vacuum. Where oxidation is a problem a protective inert atmosphere of helium or argon may be provided. In other cases the process may be conducted rapidly under atmospheric conditions.

Therefore, while my invention has been described in terms of a preferred embodiment, the scope thereof is to be limited only by the following claims.

I claim:

1. A method of making a bearing ring comprising the steps of shaping a strip of hardenable bearing steel into a semicircular member, placing a pair of said semicircular members about a cylindrical mandrel with their respective ends in abutting relationship, moving the abutting said semicircular members along said mandrel into one end of an annular chamber concentrically disposed about said mandrel, the absolute pressure in said chamber being substantially below atmospheric pressure, continuously moving the abutting said semicircular members along said mandrel while heating said semicircular members to completely austenitize said semicircular members, welding said semicircular members at their respective abutting ends by means of an electron beam to form a welded austenitic steel bearing ring, removing said welded austenitic steel bearing ring from said mandrel, quenching said ring in a liquid to a predetermined condition of hardness, said liquid being contained in a second chamber communicating with said annular chamber, the height of said liquid being of barometric height, said liquid being in communication with the atmosphere, and removing said quenching ring from said liquid.

2. A method of making a bearing ring comprising forming a strip of hardenable steel into a ring-shaped member with the ends thereof abutting, placing said ring-shaped member on a suitable mandrel, moving said member along said mandrel into a chamber disposed about said mandrel, the absolute pressure in said chamber being substantially below normal atmospheric pressure, continuously moving said ring member along said mandrel within said chamber while heating said member to completely austenitize the steel therein, welding said member at its abutting ends to form a welded austenitic steel ring, removing said welded ring from said mandrel and quenching said ring to a predetermined condition of hardness.

3. A method of making a bearing ring comprising placing a pair of semicircular hardenable steel members about a suitable mandrel with their respective ends in abutting relationship, moving the abutting said semicircular members along said mandrel into a chamber disposed about said mandrel, the absolute pressure in said chamber being substantially below normal atmospheric pressure, continuously moving the abutting said semicircular members along said mandrel within said chamber while heating said members to completely austenitize the steel therein, welding said semicircular members at the respective abutting ends to form a welded austenitic steel ring, removing said welded steel ring from said mandrel and quenching said ring to a predetermined condition of hardness.

4. A method of making a bearing ring comprising shaping a strip of hardenable steel into a semicircular member, placing a pair of said semicircular members about a cylindrical mandrel with their respective ends in abutting relationship, moving the abutting said semicircular members along said mandrel into one end of an annular chamber concentrically disposed about said mandrel, the absolute pressure in said chamber being substantially below atmospheric pressure, continuously moving the abutting said semicircular members along said mandrel while heating said semicircular members to completely austenitize the steel therein, welding said semicircular members at their respective abutting ends by means of electron beam to form a welded austenitic steel ring, removing said welded austenitic steel ring from said mandrel and subsequently quenching said ring in a liquid to a predetermined condition of hardness.

References Cited

UNITED STATES PATENTS

| | | | |
|---|---|---|---|
| 1,967,821 | 7/1934 | Hess | 29—148.4 |
| 2,133,292 | 10/1938 | Gordon | 29—504 X |
| 2,987,610 | 6/1961 | Steigerwald | 219—50 X |
| 3,138,862 | 6/1964 | Robinson | 29—501 X |

FOREIGN PATENTS 94,903   3/1932   Japan.

OTHER REFERENCES

A Dictionary of Metallurgy, by A. D. Merriman, MacDonald and Evans, Ltd., 1958, p. 180.

JOHN F. CAMPBELL, Primary Examiner

RICHARD B. LAZARUS, Assistant Examiner

U.S. Cl. X.R.

29—196.1, 487, 498, 493